United States Patent [19]

Kim

[11] Patent Number: 5,537,510
[45] Date of Patent: Jul. 16, 1996

[54] ADAPTIVE DIGITAL AUDIO ENCODING APPARATUS AND A BIT ALLOCATION METHOD THEREOF

[75] Inventor: Jong-Il Kim, Incheon, Rep. of Korea

[73] Assignee: Daewoo Electronics Co., Ltd., Seoul, Rep. of Korea

[21] Appl. No.: 367,541

[22] Filed: Dec. 30, 1994

[51] Int. Cl.$^6$ .................... H04H 1/00; H04B 1/66
[52] U.S. Cl. ............................................ 395/2.38
[58] Field of Search .................... 381/2, 47, 29, 381/1; 375/202, 243, 122, 200, 1; 395/2.12, 2.38, 2.11

[56] References Cited

U.S. PATENT DOCUMENTS

| | | | |
|---|---|---|---|
| 5,040,217 | 8/1991 | Branderburg et al. | 381/47 |
| 5,285,498 | 2/1994 | Johnston | 381/2 |
| 5,404,377 | 4/1995 | Moses | 375/200 |
| 5,469,474 | 11/1995 | Kitabatake | 375/243 |
| 5,473,631 | 12/1995 | Moses | 375/202 |
| 5,481,614 | 1/1996 | Johnston | 381/2 |

FOREIGN PATENT DOCUMENTS

| | | |
|---|---|---|
| 0446037 | 9/1991 | European Pat. Off. . |
| 0457390 | 11/1991 | European Pat. Off. . |
| 0578063 | 1/1994 | European Pat. Off. . |

OTHER PUBLICATIONS

James D. Johnston "Estimation of Perceptual Entropy Using Noise Masking Criteria", International Conference on Acoustics, Speech and Signal Processing, pp. 2524–2527, Apr. 1988.

Kai–Kuang Ma, "Generalized Optimum Bit Allocation Scheme For Source Compression," Image Processing, 1994 International Conference, pp. 864–868.

Anthony C. Koch and Michael P. Beddoes, "Analysis of Subband Quantization Noise Levels and Shapes", IEEE'1993, pp. 285–288.

James D. Johnston, "Transform Coding of Audio Signals Using Perceptual Noise Criteria," IEEE Journal on Selected Areas in Communications, vol. 6, No. 2, Feb. 1988, pp. 314–323.

Primary Examiner—Allen R. MacDonald
Assistant Examiner—Patrick N. Edouard
Attorney, Agent, or Firm—Anderson Kill Olick & Oshinsky

[57] ABSTRACT

A novel apparatus, capable of adaptively encoding an input digital audio signal, comprises a subband filtering device for receiving the input digital audio signal and filtering the received digital audio signal, on a subband-by-subband basis; a first estimator for estimating signal-to-mask ratio data, sound pressure levels and masking thresholds for the respective subbands of the digital audio signal; a second estimator for estimating perceptual entropies for the respective frames of the input digital audio signal based on the estimated signal-to-mask ratio data, sound pressure levels and masking thresholds and for deriving a mean and a standard deviation parameters for a frame group including two or more current and previous frames which corresponds to the estimated perceptual entropies; a bit allocation unit for adaptively determining bits for each of the subbands based on the estimated signal-to-mask ratio data, perceptual entropies, and mean and standard deviation parameters and for generating bit allocation information corresponding to the determined bits for each of the subbands; a quantizer for quantizing each of the filtered subbands of the digital audio signal in response to the generated bit allocation information for each of the subbands; and a formatting circuit formatting the quantized audio signal together with the generated bit allocation information.

7 Claims, 2 Drawing Sheets

ADAPTIVE DIGITAL AUDIO ENCODING APPARATUS AND A BIT ALLOCATION METHOD THEREOF

FIELD OF THE INVENTION

The present invention relates to a digital audio encoding method and an apparatus thereof; and, more particularly, to an improved adaptive digital audio encoding apparatus and a bit allocation method thereof for encoding an input digital audio signal comprising a plurality of frames based on perceptual entropies for the frames consistent with the human auditory perception.

DESCRIPTION OF THE PRIOR ART

Transmission of digitized audio signals makes it possible to deliver high quality audio signals comparable to those of a compact disc and/or a digital audio tape. When an audio signal is expressed in a digital form, a substantial amount of data need be transmitted especially in the case of high definition television system. Since, however, the available frequency bandwidth assigned to such digital audio signals is limited, in order to transmit the substantial amounts of digital data, e.g., 768 Kbits per sec for 16 bit PCM (Pulse Code Modulation) audio signal with 48 KHz sampling frequency, through the limited audio bandwidth of, e.g., about 128 KHz, it becomes inevitable to compress the digital audio data.

Among the various audio compression devices or techniques, the so-called MPEG (Moving Pictures Expert Group)-Audio algorithm, which employs a psychoacoustic algorithm, has been suggested for HDTV application.

The MPEG-Audio algorithm employs four primary parts of: subband filtering, psychoacoustic modeling, quantizing and coding, and frame formatting. The subband filtering is a process of mapping, from the time domain to the frequency domain, an input PCM digital audio signal. A filterbank with B (e.g., 32) subbands may be used. In each subband, 12 or 36 samples are grouped for the processing thereof; and the grouped samples from said B subbands, i.e., N×12 or 36, constitute a "frame", which is a processing unit for the encoding, transmission and decoding of audio signals. The psychoacoustic modeling creates a set of data, e.g., SMR (signal-to-mask ratio) data, for each subband or group of subbands to control the quantizing and coding thereof. Available bits are, then, adaptively allocated to each subband of a frame with reference to the SMR in the process of quantizing and coding the subband samples. A frame formatter formats the frame data together with other required side information in a suitable fashion for transmission.

In the above MPEG audio technique, however, since a fixed number of bits is allocated to each frame, it cannot afford to reflect such statistical properties as means, standard deviations and perceptual entropies of the input digital audio signal which may vary continuously among the frames.

SUMMARY OF THE INVENTION

It is, therefore, a primary object of the invention to provide a novel apparatus and bit allocation method thereof for encoding a digital audio signal comprising a plurality of frames based on perceptual entropies for the frames consistent with the human auditory perception, thereby enhancing the coding efficiency and the audio quality.

In accordance with one aspect of the present invention, there is provided a novel apparatus for adaptively encoding an input digital audio signal including a plurality of frames wherein each frame contains a plurality of subbands, which comprises: means for receiving the input digital audio signal and filtering the received digital audio signal, on a subband-by-subband basis; first estimation means for estimating signal-to-mask ratio data, sound pressure levels and masking thresholds for the respective subbands of the digital audio signal; second estimation means for estimating perceptual entropies for the respective frames of the input digital audio signal based on the estimated signal-to-mask ratio data, sound pressure levels and masking thresholds and for deriving a mean and a standard deviation parameters for a frame group including two or more current and previous frames which corresponds to the estimated perceptual entropies; bit allocation means for adaptively determining bits for each of the subbands based on the estimated signal-to-mask ratio data, perceptual entropies, and mean and standard deviation parameters and for generating bit allocation information corresponding to the determined bits for each of the subbands; means for quantizing each of the filtered subbands of the digital audio signal in response to the generated bit allocation information for each of the subbands; and means for formatting the quantized audio signal together with the generated bit allocation information.

In accordance with another aspect of the present invention, there is provided a novel bit allocation method for use in a digital audio encoding apparatus for adaptively encoding an input digital audio signal including a plurality of frames wherein each of the frames includes a plurality of subbands, said method comprising the steps of: receiving and filtering the input digital audio signal, on a subband-by-subband basis; estimating signal-to-mask ratio data, sound pressure levels and masking thresholds for the respective subbands of the digital audio signal; estimating perceptual entropies for the respective frames of the input digital audio signal based on the estimated signal-to-mask ratio data, sound pressure levels and masking thresholds, and deriving a mean and a standard deviation parameters for a frame group including two or more current and previous frames which corresponds to the estimated perceptual entropies; estimating decision levels of the frame group based on the estimated mean and standard deviation parameters; generating a difference signal representing the difference between each of the perceptual entropies and the mean parameter, respectively; determining bits for the respective frames of the frame group based on the estimated decision levels, the total number of decision levels, the perceptual entropies and the mean bits, and generating bit allocation information corresponding to the determined bits for each of the frames; and determining bits for the respective subbands of each frame based on the estimated signal-to-mask ratio data and the generated bit allocation information, and generating bit allocation information corresponding to the determined bits for each of the subbands.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
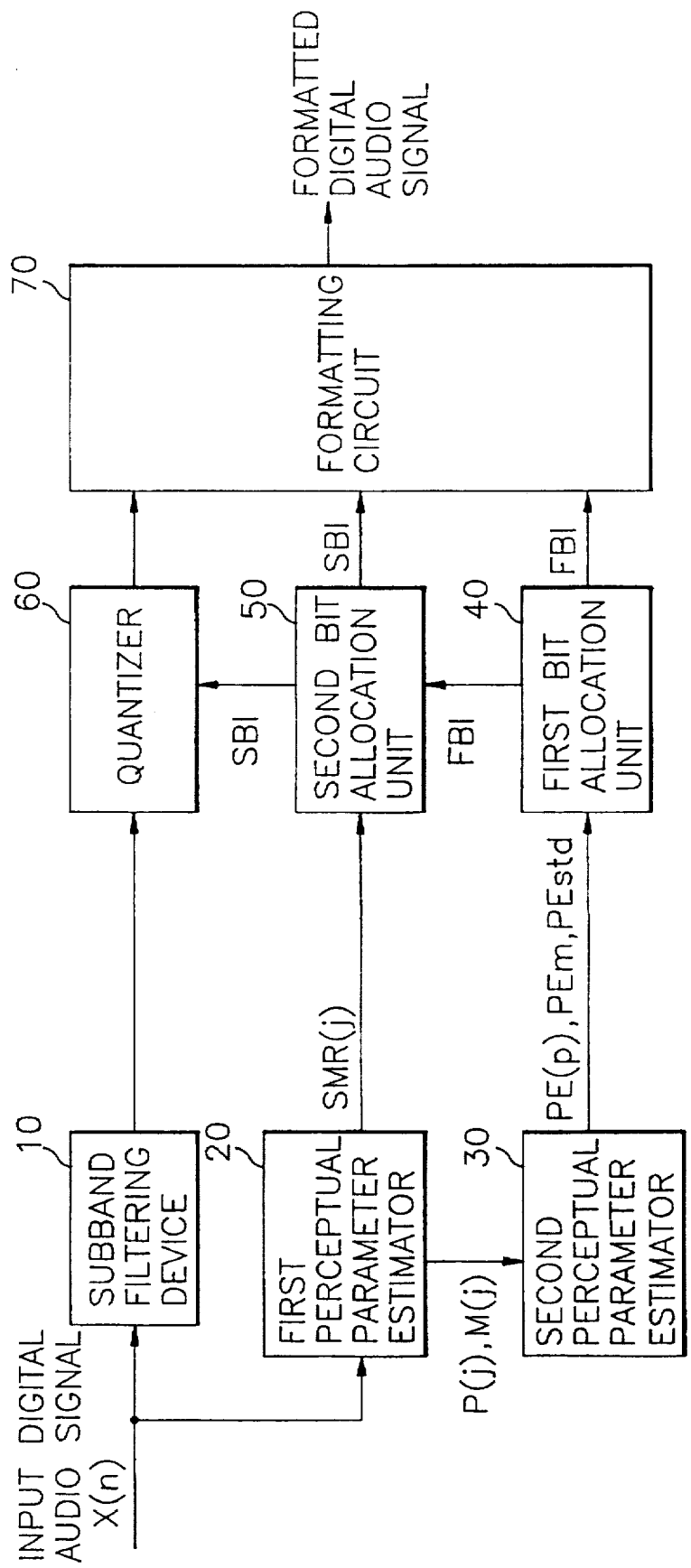
FIG. 1 shows a block diagram schematically illustrating the novel apparatus and bit allocation method for adaptively encoding an input digital audio signal in accordance with the present invention.

Referring to FIG. 1, there is shown a block diagram schematically illustrating an adaptive digital audio encoding apparatus and bit allocation method in accordance with the present invention.

The adaptive digital audio encoding apparatus comprises a subband filtering device 10, first and second perceptual parameter estimators 20 and 30, first and second bit allocation units 40 and 50, a quantizer 60 and a formatting circuit 70.

An input digital audio signal X(n) of an ith frame, or a current frame, which includes N samples, i.e., n=0, 1, ..., N-1, is applied to the first perceptual parameter estimator 20 and the subband filtering device 10 which is adapted to perform a subband filtering operation of the input digital audio signal, wherein N is a positive integer. A "frame" used herein denotes a part of the digital audio signal which corresponds to a fixed number of audio samples and is a processing unit for the encoding and decoding of the digital audio signal.

As shown, the subband filtering device 10 receives the input digital audio signal of the current frame and carries out the filtering of the input digital audio signal by employing a subband filtering technique well known in the art, e.g., the method disclosed in the so-called MPEG Audio Algorithm described in ISO/IEC JTC1/SC2/WG 11, "Part 3, Audio Proposal", CD-11172-3(1991). That is, the subband filtering device 10 serves to split the input digital audio signal with a sampling frequency $f_s$ into B, e.g., 32, equally spaced subbands with sampling frequencies of $f_s/B$ and provides the quantizer 60 with the split subband audio samples.

On the other hand, the first perceptual parameter estimator 20 receives the input digital audio signal of the current frame and estimates signal-to-mask ratio (SMR) data, sound pressure levels and masking thresholds for the respective subbands included in the input digital audio signal of the current frame by using a psychoacoustic model, e.g., discussed in the MPEG Audio Algorithm. The signal-to-mask for each subband is derived as follows:

$$SMR(j)=P(j)-M(j) \quad (1)$$

wherein j is a subband index with j=0, 1, ..., B-1, B being the total number of subbands in a frame; SMR(j), a signal-to-mask ratio in subband j; P(j), a sound pressure level in subband j estimated from a FFT (Fast Fourier Transform) technique; M(j), a masking threshold in subband j; and SMR(j), P(j) and M(j) are all in a dB(decibel) unit.

The masking threshold represents an audible limit which is a sum of the intrinsic audible limit or threshold of a sound and an increment caused by the presence of other tonal and non-tonal components of the audio signal. The SMR(j)'s are then fed to the second bit allocation unit 50, while P(j)'s and M(j)'s are coupled to the second perceptual parameter estimator 30.

The second perceptual parameter estimator 30 serves to estimate a perceptual entropy PE(i) for the input digital audio signal of an ith frame based on the sound pressure levels P(j)'s and the masking thresholds M(j)'s from the first perceptual parameter estimator 20. The perceptual entropy PE(i) for the input digital audio signal of the ith frame, as well known in the art, may be represented as:

$$PE(i) = \frac{1}{B} \sum_{j=0}^{B-1} \text{MAX}\left[0, \frac{1}{2}\log_2\frac{P(j)}{M(j)}\right] dB \quad \text{Eq. (2)}$$

wherein i, j and B have the same meanings as previously defined.

Eq. (2) can be obtained by applying the so-called rate distortion theory; and corresponds to a perceptual entropy based on the human auditory perception. Also, the second perceptual parameter estimator 30 is adapted to group the estimated perceptual entropies, i.e., PE(i), PE(i-1), PE(i-2) and PE(i-3) for Q, e.g., 4, number of the current and its previous frames in order to adaptively allocate bits among them in accordance with the processing of the first bit allocation unit 40 which will be described in details hereinafter with reference to FIGS. 1 and 2 wherein the grouped perceptual entropy represents those of a frame group including the four current and previous frames; and estimates a mean and a standard deviation parameters PEm and PEstd representing their statistical properties by using the total perceptual entropies of the frame group. The mean parameter PEm for the total perceptual entropies of the frame group, as well known in the art, may be obtained as:

$$PEm = \frac{1}{Q} \sum_{p=0}^{Q-1} PE(p) \quad \text{Eq. (3)}$$

wherein p is a frame index used in the grouped frame data with p=0, 1, ..., Q-1, Q being the total frame number of the frame group; and PE(p) represents a perceptual entropy of a pth frame in the frame group.

Accordingly, the standard deviation parameter PEstd for the total perceptual entropies of the frame group, as well known in the art, may be calculated as:

$$PEstd = \sqrt{\frac{1}{Q}\sum_{p=0}^{Q-1}|PE(p) - PEm|^2} \quad \text{Eq. (4)}$$

wherein p and Q have the same meanings as previously defined.

The perceptual entropy of the pth frame, PE(p), and the mean and standard deviation parameters PEm and PEstd, grouped and estimated at the second perceptual parameter estimator 30, are then applied to the first bit allocation unit 40 which is adapted to determine bits for the respective frames included in the frame group based on the perceptual entropy of the pth frame and the mean and standard deviation parameters from the second perceptual parameter estimator 30 and provides the second bit allocation unit 50 and the formatting circuit 70 with the bit allocation information FBI corresponding to the determined bits for the respective frames of the frame group.

Figure 2:
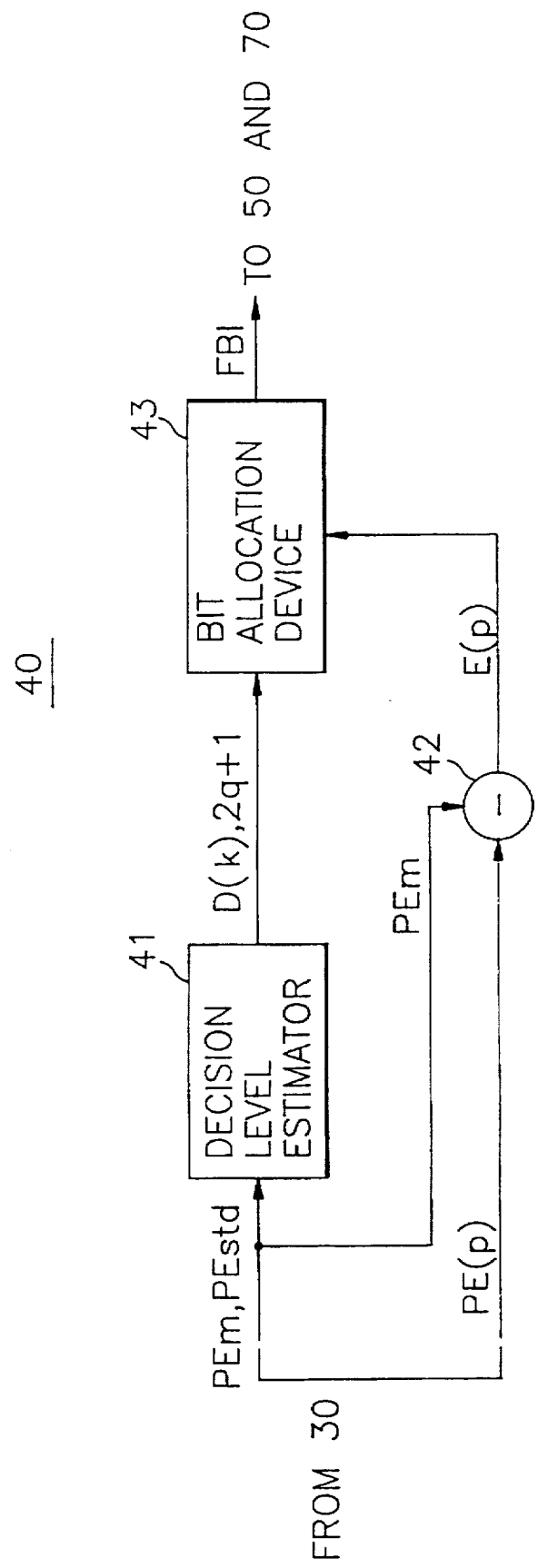
FIG. 2 depicts a detailed block diagram of the first bit allocation unit shown in FIG. 1.

Turning now to FIG. 2, there is shown a detailed block diagram of the first bit allocation unit 40 shown in FIG. 1. The first bit allocation unit 40 comprises a decision level estimator 41, a subtractor 42 and a bit allocation device 43.

The decision level estimator 41 serves to estimate optimal decision levels of the frame group for the bit allocation device 43 to adaptively allocate bits to each of the frames in the frame group, depending on the mean and standard deviation parameters PEm and PEstd from the second perceptual parameter estimator 30 shown in FIG. 1. In accordance with a preferred embodiment of the present invention, a kth decision level D(k) of the frame group may be represented as:

$$D(k)=NF \cdot PEstd \cdot k \quad (5)$$

wherein k is a decision level index with k=−q to q, q being a positive integer, NF is a normalization factor in the frame group.

As can be seen from Eq. (5), the level interval between the kth decision level D(k) and a (k-1)st decision level D(k-1) of the grouped frame data depends on both the standard deviation PEstd from the second perceptual parameter estimator 30 and the normalization factor NF of the grouped frame data, while the total number of decision levels is predetermined. It should be appreciated that the total number of decision levels can be determined based on the required coding efficiency and the audio quality of the encoding apparatus. The normalization factor NF of the frame group used in the decision level estimator 41 can be preferably determined by employing the mean and standard deviation parameters PEm and PEstd from the second perceptual parameter estimator 30 and a global mean and a mean of global standard deviation parameters, PEgm and PEgstd, prestored in a memory(not shown) thereof in order to derive the optimal decision levels of the grouped frame data, which closely match the actual human auditory perception. Each of the global mean and the mean of global standard deviation parameters may be easily measured by using the mean and standard deviation parameters estimated for a predetermined duration, respectively. In accordance with the present invention, the normalization factor NF of the frame group is obtained as follows:

$$NF = \left(\frac{PEgstd}{PEgm}\right) \cdot \left(\frac{PEm}{PEstd}\right) \qquad \text{Eq. (6)}$$

As can be seen from Eqs. (5) and (6), it should be noted that the decision levels of the frame group can be determined as an integer multiple of the mean parameter therefor.

On the other hand, the subtractor 42 calculates a difference signal E(p) of the pth frame in the frame group by subtracting the perceptual entropy PE(p) with the mean parameter PEm from the second perceptual parameter estimator 30. Subsequently, the decision level D(k) and the total number, i.e., 2q+1, of the decision levels, which has been estimated and predetermined at the decision level estimator 41, and the difference signal E(p) calculated at the subtractor 42 are simultaneously provided to the bit allocation device 43.

The bit allocation device 43 determines bits for each frame of the frame group based on the decision levels and the total number of decision levels from the decision level estimator 41 and the difference signal from the subtractor 42 and provides the second bit allocation unit 50 and the formatting circuit 70 shown in FIG. 1 with the bit allocation information FBI corresponding to the determined bits for each frame. In accordance with a preferred embodiment of the present invention, the bit allocation FB(p) of the pth frame in the frame group may be determined as:

$$FB(p) = FBm + \frac{BV}{2q+1} \cdot I \qquad \text{Eq. (7)}$$

wherein p has the same meaning as previously defined; FBm, mean bits, e.g., 3072 bits per frame for 16-bit PCM (Pulse Code Modulation) audio data with 48 KHz sampling frequency at 128 Kbits data transmission rate per sec; BV, a predetermined bit variation value; 2q+1, the total number of predetermined decision levels; and I, a level index in frame p.

As can be seen from Eq. (7), the bit allocation for the pth frame, FB(p), can be determined by adding the number of mean bits, FBm, with the number of varied bits which can be derived from the second term thereof. The predetermined bit variation value BV therein may be determined as a value which is identical to the mean bits for one frame as defined in Eq. (7), and the level index I of the pth frame in the frame group can be obtained based on both the decision levels D(k)'s from the decision level estimator 41 and the difference signal E(p) from the subtractor 42. In accordance with the preferred embodiment of the present invention, the level index I of the pth frame in the frame group may be represented as shown in Table (wherein it assumed that the interval of decision levels is 1.27 and the decision level index k is −2 to 2):

TABLE

| Range of decision level D | Level index (I) |
|---|---|
| ~−2.56 | −2 |
| −2.55~−1.28 | −1 |
| −1.27~1.26 | 0 |
| 1.27~2.54 | 1 |
| 2.55~ | 2 |

As can be seen from Table, if the difference signal E(p) exists between the decision levels −1.28 and −2.0, then the level index I of the pth frame may be selected as −1; and if it is between the decision levels −1.27 and 2.0, then the level index I may be chosen as 1, and so on. In this manner, the bit allocation FB(p) of the pth frame can be advantageously determined by employing Eq. (7).

Subsequently, the bit allocation information FBI corresponding to the determined bits for each frame of the frame group at the bit allocation unit 43 and the signal-to-mask ratio SMR(j) from the first perceptual parameter estimator 20 shown in FIG. 1 are simultaneously applied to the second bit allocation unit 50; and the bit allocation information FBI for each frame is supplied to the formatting circuit 70.

Referring back to FIG. 1, the second bit allocation unit 50 receives the signal-to-mask ratio SMR(j) fed from the first perceptual parameter estimator 20 and the bit allocation information FBI for each frame supplied from the first bit allocation unit 40, determines bits for each subband included in each frame of the frame group, and provides bit allocation information SBI corresponding to the determined bits for each subband to the quantizer 60 and the formatting circuit 70, respectively. The principle used in the second bit allocation unit 50 lies in the optimization of the total mask-to-noise ratio over a frame under the constraint that the number of bits used should not exceed the number of bits available for that frame transferred from the first bit allocation unit 40. Subsequently, the bit allocation information SBI for each subband from the second bit allocation unit 50 and the split subband audio samples from the subband filtering device 10 are simultaneously applied to the quantizer 60.

The quantizer 60 serves to adaptively quantize the split subband audio samples from the subband filtering device 10 based on its corresponding bit allocation information from the second bit allocation unit 50 and provides the quantized audio signal for each subband to the formatting circuit 70.

At the formatting circuit 70, the quantized audio samples from the quantizer 60 and the bit allocation information from the first and second bit allocation units 40 and 50 are formatted and transmitted to a transmitter(not shown) for the transmission thereof, thereby improving the coding efficiency and the audio quality of the input digital audio signal. The principles and functions of the subband filtering device 10, the first perceptual parameter estimator 20, the second bit allocation unit 50, the quantizer 60 and the formatting circuit 70 are basically identical to those which can be found in the MPEG Audio Algorithm.

While the present invention has been shown and described with reference to the particular embodiments, it will be apparent to those skilled in the art that many changes and modifications may be made without departing from the spirit and scope of the invention as defined in the appended claims.

What is claimed is:

1. An apparatus for adaptively encoding an input digital audio signal including a plurality of frames wherein each of the frames includes a plurality of subbands, which comprises:

means for receiving and filtering the input digital audio signal, on a subband-by-subband basis;

first estimation means for estimating signal-to-mask ratio data, sound pressure levels and masking thresholds for the respective subbands of the digital audio signal;

second estimation means for estimating perceptual entropies for the respective frames of the input digital audio signal based on the estimated signal-to-mask ratio data, sound pressure levels and masking thresholds and for deriving a mean and a standard deviation parameters for a frame group including two or more current and previous frames which corresponds to the estimated perceptual entropies;

bit allocation means for adaptively determining bits for each of the subbands based on the estimated signal-to-mask ratio data, perceptual entropies, and mean and standard deviation parameters and for generating bit allocation information corresponding to the determined bits for each of the subbands;

means for quantizing each of the filtered subbands of the digital audio signal in response to the generated bit allocation information for each of the subbands; and means for formatting the quantized audio signal together with the generated bit allocation information.

2. The apparatus as recited in claim 1, wherein said bit allocation means includes:

means for estimating decision levels of the frame group based on the estimated mean and standard deviation parameters;

means for generating a difference signal representing the difference between each of the perceptual entropies and the mean parameter;

first bit allocation means for determining bits for the respective frames of the frame group based on the estimated decision levels, the total number of decision levels, the perceptual entropies and predetermined mean bits, and for generating a bit allocation information corresponding to the determined bits for each of the frames; and second bit allocation means for determining bits for the respective subbands of each frame based on the estimated signal-to-mask ratio data and the generated bit allocation information, and for generating the bit allocation information corresponding to the determined bits for each of the subbands.

3. The apparatus as recited in claim 2, wherein each of the decision levels of the frame group, D, is determined as:

$$D = NF \cdot PEstd \cdot k$$

wherein k is a decision level index with k=−q to q, q being a positive integer, NF is a normalization factor in the frame group; and PEstd is the standard deviation parameter of the frame group.

4. The apparatus as recited in claim 3, wherein the bit allocation for a pth frame, FB(p), is obtained as:

$$FB(p) = FBm + \frac{BV}{2q+1} \cdot l$$

wherein p is a frame index in the frame group; FBm, a function of mean bits for one frame; 2q+1, the total number of predetermined decision levels; and l, a level index in the pth frame.

5. A bit allocation method for use in a digital audio encoding apparatus for adaptively encoding an input digital audio signal including a plurality of frames wherein each of the frames includes a plurality of subbands, said method comprising the steps of:

receiving and filtering the input digital audio signal, on a subband-by-subband basis;

estimating signal-to-mask ratio data, sound pressure levels and masking thresholds for the respective subbands of the digital audio signal;

estimating perceptual entropies for the respective frames of the input digital audio signal based on the estimated signal-to-mask ratio data, sound pressure levels and masking thresholds, and deriving a mean and a standard deviation parameters for a frame group including two or more current and previous frames which corresponds to the estimated perpeptual entropies;

estimating decision levels of the frame group based on the estimated mean and standard deviation parameters;

generating a difference signal representing the difference between each of the perceptual entropies and the mean parameter;

determining bits for the respective frames of the frame group based on the estimated decision levels, the total number of decision levels, the perceptual entropies and the mean bits, and generating bit allocation information corresponding to the determined bits for each of the frames; and determining bits for the respective subbands of each frame based on the estimated signal-to-mask ratio data and the generated bit allocation information, and generating bit allocation information corresponding to the determined bits for each of the subbands.

6. The method as recited in claim 5, wherein each of the decision levels of the frame group, D, is determined as:

$$D = NF \cdot PEstd \cdot k$$

wherein k is a decision level index with k=−q to q, q being a positive integer, NF is a normalization factor in the frame group; and PEstd is the standard deviation parameter of the frame group.

7. The apparatus as recited in claim 6, wherein the bit allocation for a pth frame, FB(p), is obtained as:

$$FB(p) = FBm + \frac{BV}{2q+1} \cdot l$$

wherein p is a frame index in the frame group; FBm, a function of mean bits for one frame; 2q+1, the total number of predetermined decision levels; and l, a level index in the pth frame.

* * * * *